United States Patent
Petr et al.

(10) Patent No.: US 10,316,126 B2
(45) Date of Patent: Jun. 11, 2019

(54) IMPACT MODIFIER AND A POLYMER COMPOSITION COMPRISING THE SAME

(71) Applicant: Rohm and Haas Company, Philadelphia, PA (US)

(72) Inventors: Michael T. Petr, Collegeville, PA (US); Carlos A. Cruz, Collegeville, PA (US)

(73) Assignee: Rohm and Haas Company, Collegeville, PA (US)

(*) Notice: Subject to any disclaimer, the term of this patent is extended or adjusted under 35 U.S.C. 154(b) by 0 days.

(21) Appl. No.: 15/536,145

(22) PCT Filed: Dec. 17, 2015

(86) PCT No.: PCT/US2015/066230
§ 371 (c)(1),
(2) Date: Jun. 15, 2017

(87) PCT Pub. No.: WO2016/106055
PCT Pub. Date: Jun. 30, 2016

(65) Prior Publication Data
US 2017/0362367 A1    Dec. 21, 2017

Related U.S. Application Data

(60) Provisional application No. 62/095,301, filed on Dec. 22, 2014.

(51) Int. Cl.
| | | |
|---|---|---|
| C08F 265/06 | (2006.01) |
| C08L 27/06 | (2006.01) |
| C08F 285/00 | (2006.01) |
| C08L 51/00 | (2006.01) |

(52) U.S. Cl.
CPC .......... *C08F 265/06* (2013.01); *C08F 285/00* (2013.01); *C08L 27/06* (2013.01); *C08L 51/003* (2013.01)

(58) Field of Classification Search
CPC ...... C08F 265/06; C08F 12/08; C08F 285/00; C08K 5/57; C08K 27/06; C08K 51/00
See application file for complete search history.

(56) References Cited

U.S. PATENT DOCUMENTS

| | | | | |
|---|---|---|---|---|
| 4,195,134 A | * | 3/1980 | Coleman | C08L 67/02 524/605 |
| 5,612,413 A | | 3/1997 | Rozkuszka et al. | |
| 7,173,082 B2 | | 2/2007 | Ahn et al. | |
| 2005/0119393 A1 | | 6/2005 | Ahn et al. | |
| 2007/0060710 A1 | | 3/2007 | Jeong et al. | |
| 2010/0028546 A1 | | 2/2010 | Roschmann et al. | |

FOREIGN PATENT DOCUMENTS

| | | |
|---|---|---|
| EP | 0850740 | 7/1998 |
| EP | 0927616 | 10/2006 |
| WO | WO2012/006297 | 6/2002 |
| WO | WO2005/023882 | 3/2005 |
| WO | WO 02/48223 | 11/2007 |

OTHER PUBLICATIONS

Glass transition Temperatures dowloaded from http://polymerdatabase.com/polymer%20physics/Polymer%20Tg.html Mar. 22, 2018.*
Fox Equation downloaded from http://www.wernerblank.com/equat/Fox_equation15.htm Mar. 22, 2018.*
EP Office Action dated Aug. 24, 2017; from counterpart EP Application No. 15828592.4.
PCt Search Report dated Mar. 11, 2016; from counterpart PCT application PCT/US2015/066230.
PCT IPR Report dated Jun. 27, 2017; from counterpart PCT application PCT/US2015/066230.
Danni Wang et al; "Dispersion Polymerization of n-Butyl Acrylate," Journal of Applied Polymer Science, vol. 84, 2692-2709 (2002).
Danni Wang et al; "SeededDispersion Polymerization," Journal of Applied Polymer Science; vol. 84, 2710-2720 (2002).
J. Hasa et al.; "Stress-Strain Behavior in Extension of Elastomer Networks with Crosslinks of Different Lengths," Journal of Polymer Science: Polymer Physics Edition, vol. 11, 297-311 (1973).
Rodrigo Paris et al;, "Synthesis and characterization of functional gradient copolymers of allyl methacrylate and butyl acrylate," Journal of Polymer Science Part. A-Polymer Chemistryl, (2006), 44(18) pp. 5304-5315.
EP Office Action received Sep. 13, 2018; from counterpart EP Application No. 15828592.4.
Chinese office action received Feb. 15, 2019; from counterpart Chinese Application No. 201580066997.3.

* cited by examiner

*Primary Examiner* — Irina S Zemel
*Assistant Examiner* — Jeffrey S Lenihan

(57) ABSTRACT

An impact modifier composition comprising one or more core/shell polymers which comprise a crosslinked core having from 98 to 99.9 wt % units derived from one or more acrylate monomers and from 0.1 to 2 wt % units derived from a crosslinker containing a vinylically unsaturated moiety with an acrylate free radical reactivity ratio from 0.8 to 1.2 and one or more non-acrylate vinylically unsaturated moiety(ies) with an acrylate free radical reactivity ratio(s) greater than 1, wherein the crosslinked core has a swell ratio in THF between 7 and 15 and a Tg equal to less than 10° C.; and a shell having from 20 to 100 wt % units derived from one or more (meth)acrylate monomers and having a Tg of greater than 20° C. is provided. Also provided is a polymer composition comprising the impact modifier composition and a base structural polymer.

1 Claim, No Drawings

IMPACT MODIFIER AND A POLYMER COMPOSITION COMPRISING THE SAME

FIELD OF INVENTION

The disclosure relates to an impact modifier and a polymer composition comprising the same.

BACKGROUND OF THE INVENTION

In an impact modifier, the impact resistance comes from the constituent crosslinked, low glass transition ($T_g$) rubber. The characteristics of this rubber directly affect the ability of the modifier to provide ductility in a base polymer during impact. One of these characteristics is crosslink density because it controls the stiffness of the rubber and its ability to cavitate. Often, in an impact modifier, the crosslink density is controlled by the addition of a crosslinker into the low $T_g$ polymer. The distribution of the crosslink density is directly proportional to the distribution of the crosslinker in the rubber. The rubber is also often made with a shot process, whereby all the monomer is charged to the reactor and then its polymerization is initiated, in order to keep the standing monomer concentration high and the branching in the rubber low; therefore, the crosslinker distribution, and thus, the crosslink density distribution is entirely dependent on the reactivity ratios of the rubber monomer and crosslinker.

Butyl, ethyl, 2-ethylhexyl and other acrylic esters are often the rubber monomers of choice, and either a multifunctional acrylate or allyl methacrylate (ALMA) are often the crosslinkers of choice. ALMA has the advantage of different reactivities of the allyl double bond and the methacrylate double bond. Therefore, ALMA produces less backbiting loops in the rubber and more graftlinks to the shell. However the higher reactivity of the methacrylate double bond in ALMA compared to that of the acrylate double bond causes the crosslink density to be high at the beginning of each shot and then decrease to zero at the end of the shot. Thus, there is a need for a more effective crosslinker to use in an acrylic impact modifier made by the shot process.

SUMMARY OF THE INVENTION

The disclosure is for an impact modifier composition and a polymer composition comprising the same.

In one embodiment, the disclosure provides an impact modifier composition comprising one or more core/shell polymers which comprise a crosslinked core having from 98 to 99.9 wt % units derived from one or more acrylate monomers and from 0.1 to 2 wt % units derived from a crosslinker containing a vinylically unsaturated moiety with an acrylate free radical reactivity ratio from 0.8 to 1.2 and one or more non-acrylate vinylically unsaturated moiety(ies) with an acrylate free radical reactivity ratio(s) greater than 1, wherein the crosslinked core has a swell ratio in THF between 7 and 15 and a glass transition temperature, Tg, of less than or equal to 10° C.; and a shell having from 20 to 100 wt % units derived from one or more (meth)acrylate monomers and having a Tg of greater than 20° C.

In another embodiment, the disclosure provides a polymer composition comprising an impact modifier and a base polymer.

DETAILED DESCRIPTION OF THE INVENTION

The disclosure provides an impact modifier and a polymer composition comprising the impact modifier.

(Meth)acrylate means acrylate, methacrylate, or combinations of acrylate and methacrylate. For example, the term methyl (meth)acrylate may mean solely methyl methacrylate, solely methyl acrylate or a combination of methyl methacrylate and methyl acrylate.

Free radical reactivity ratio, as used herein, means the free radical propagation rate constant from the acrylate monomer(s) to the acrylate monomer(s) relative to the free radical propagation rate constant from the acrylate monomer(s) to any other vinylically unsaturated moiety in the crosslinker.

In a first embodiment, the disclosure provides an impact modifier composition comprising one or more core/shell polymers which comprise a crosslinked core having from 98 to 99.9 wt % units derived from one or more acrylate monomers and from 0.1 to 2 wt % units derived from a crosslinker containing a vinylically unsaturated moiety with an acrylate free radical reactivity ratio from 0.8 to 1.2 and one or more non-acrylate vinylically unsaturated moiety(ies) with an acrylate free radical reactivity ratio(s) greater than 1, wherein the crosslinked core has a swell ratio in THF between 7 and 15 and a glass transition temperature, Tg, of less than or equal to 10° C.; and a shell having from 20 to 100 wt % units derived from one or more (meth)acrylate monomers and having a Tg of greater than 20° C.

In a second embodiment, the disclosure provides a polymer composition comprising from greater than 0 to 50 wt % of one or more impact modifier compositions according to any embodiment disclosed herein; and from 50 to less than 100 wt % of any structural base polymers selected from the group consisting of but not limited to polyesters, styrenic polymers, polymethacrylates, polyvinylchloride, polycarbonate, polyamides, copolymers and blends thereof and combinations thereof.

The one or more core/shell polymers comprises a crosslinked core having from 98 to 99.9 wt % units derived from one or more acrylate monomers. All individual values and subranges from 98 to 99.9 wt % are included and disclosed herein; for example the amount of units derived from one or more acrylate monomers can range from a lower limit of 98, 98.4, 98.8, 99.2 or 99.6 wt % to an upper limit of 98.2, 98.6, 99.0, 99.4, 99.8 or 99.9 wt %. For example, the amount of units derived from one or more acrylate monomers in the crosslinked core may be from 98 to 99.9 wt %, or in the alternative, from 98 to 99 wt %, or in the alternative, from 98.9 to 99.9 wt %, or in the alternative, from 98.5 to 99.5 wt %.

Any $C_1$ to $C_{20}$ alkyl acrylate monomer may be used in forming the crosslinked core. Exemplary acrylate monomers include butyl acrylate, ethyl acrylate, and 2-ethylhexyl acrylate.

The disclosure further provides the impact modifier and polymer composition according to any embodiment disclosed herein, except that the acrylate monomer used in the crosslinked core is butyl acrylate, ethyl acrylate, or 2-ethylhexyl acrylate.

The one or more core/shell polymers comprises a crosslinked core having from 0.1 to 2 wt % units derived from a crosslinker containing a vinylically unsaturated moiety with an acrylate free radical reactivity ratio from 0.8 to 1.2 and one or more non-acrylate vinylically unsaturated moiety(ies) with an acrylate free radical reactivity ratio(s) greater than 1. All individual values and subranges from 0.1 to 2 wt % are included and disclosed herein; for example, the amount of units derived from the crosslinker can range from a lower limit of 0.1, 0.5, 0.9, 1.3 or 1.7 wt % to an upper limit of 0.3, 0.7, 1.1, 1.5, 1.9 or 2 wt %. For example, the amount of units derived from the crosslinker may be from 0.1 to 2 wt %, or in the alternative, from 0.1 to 1 wt %, or in the alternative, from 1 to 2 wt %, or in the alternative, from 0.5 to 1.5 wt %.

The vinylically unsaturated moiety has an acrylate free radical reactivity ratio from 0.8 to 1.2. All individual values and subranges from 0.8 to 1.2 are included and disclosed herein; for example, the acrylate free radical reactivity ratio can range from a lower limit of 0.8, 0.9, 1.0 or 1.1 to an upper limit of 0.9, 1.0, 1.1, or 1.2.

Crosslinker which may be used in the crosslinked core include, but are not limited to, allyl acrylate, 2-allyloxyethyl acrylate, 2-allyloxyethoxyethyl acrylate, allyloxypropyl acrylate, methallyl acrylate, crotyl acrylate, cyclol acrylate, N-allyl acrylamide, N,N-diallyl acrylamide dicyclopentenyl acrylate, dicyclopentadienyl acrylate.

The crosslinked core has a glass transition temperature, Tg, of less than or equal to 10° C. All individual values and subranges of less than or equal to 10° C. are included and disclosed herein. For example, the Tg of the crosslinked core may be less than or equal to 10° C., or in the alternative, less than or equal to 0° C., or in the alternative, less than or equal to −10° C., or in the alternative, less than or equal to −20° C.

The disclosure further provides the impact modifier and polymer composition according to any embodiment disclosed herein, except that the crosslinked core comprises 98 to 99.9 wt % units derived from butyl acrylate and from 0.1 to 2 wt % units derived from a crosslinker.

The disclosure further provides the impact modifier and polymer composition according to any embodiment disclosed herein, except that the crosslinked core comprises from 99.1 to 99.8 wt % units derived from butyl acrylate and from 0.2 to 0.9 wt % units derived from a crosslinker.

The disclosure further provides the impact modifier and polymer composition according to any embodiment disclosed herein, except that the crosslinked core comprises 98 to 99.9 wt % units derived from butyl acrylate and from 0.1 to 2 wt % units derived from allyl acrylate.

The disclosure further provides the impact modifier and polymer composition according to any embodiment disclosed herein, except that the crosslinked core comprises from 99.1 to 99.8 wt % units derived from butyl acrylate and from 0.2 to 0.9 wt % units derived from allyl acrylate.

The crosslinked core has a swell ratio in THF between 7 and 15. All individual values and subranges from 7 to 15 are included and disclosed herein; for example the swell ratio of the crosslinked core in THF can range from a lower limit of 7, 9, 11 or 13 to an upper limit of 8, 10, 12, 14 or 15. For example, the swell ratio of the crosslinked core in THF can be from 7 to 15, or in the alternative, from 7 to 11, or in the alternative, from 11 to 15, or in the alternative, from 9 to 13.

The one or more core/shell polymers comprise a shell having from 20 to 100 wt % units derived from one or more (meth)acrylate monomers. All individual values and subranges from 20 to 100 wt % units derived from one or more (meth)acrylate monomers are included and disclosed herein; for example, the amount of units derived from one or more (meth)acrylate monomers can range from a lower limit of 20, 30, 40, 50, 60, 70, 80 or 90 wt % to an upper limit of 25, 35, 45, 55, 65, 75, 85, 95 or 100 wt %. For example, the amount of units derived from one or more (meth)acrylate monomers in the shell may be from 20 to 100 wt %, or in the alternative, from 60 to 100 wt %, or in the alternative, from 20 to 60 wt %, or in the alternative, from 40 to 80 wt %.

The shell comprises from 0 to 80 wt % units derived from one or more other monomer(s), such as but not limited to styrenic monomers, vinyl acetate, ethylene, propylene, acrolein, meth(acrylamide), vinyl chloride, or any other vinylically unsaturated monomers. All individual values and subranges from 0 to 80 wt % are included and disclosed herein; for example, the amount of units derived from one or more other monomer(s) can range from a lower limit of 0, 20, 40, 60 or 70 wt % to an upper limit of 10, 30, 50 or 80 wt %. For example, the shell may contain an amount of units derived from one or more other monomer(s) from 0 to 80 wt %, or in the alternative, from 0 to 40 wt %, or in the alternative, from 40 to 80 wt %, or in the alternative, from 20 to 60 wt %.

The shell has a Tg of greater than 20° C. All individual values and subranges from greater than 20° C. are included and disclosed herein. For example, the Tg of the shell may be greater than 20° C., or in the alternative, greater than 30° C., or in the alternative, greater than 40° C., or in the alternative, greater than 60° C.

Any alkyl (meth)acrylate monomer may be used in the shell of the one or more core/shell polymers. Exemplary (meth)acrylate monomers include $C_1$-$C_{20}$ alkyl methacrylates, including but not limited to methyl methacrylate, ethyl acrylate, and combinations thereof.

The polymer composition comprises from greater than 0 to 50 wt % of one or more impact modifier compositions according to any embodiment disclosed herein. All individual values and subranges from greater than 0 to 50 wt % are included and disclosed herein; for example, the amount of one or more impact modifier compositions may range from a lower limit of 0.1, 1, 10, 20, 30 or 40 wt % to an upper limit of 0.5, 5, 15, 25, 35 or 50 wt %. For example, the amount of one or more impact modifier compositions can be from greater than 0 to 50 wt %, or in the alternative, from 0.1 to 25 wt %, or in the alternative, from 25 to 50 wt %, or in the alternative, from 10 to 30 wt %.

The polymer composition comprise from 50 to less than 100 wt % of a structural base polymer selected from the group consisting of polyesters, styrenic polymers, polymethacrylates, polyvinylchloride, polycarbonate, polyamides, copolymers and blends thereof and combinations thereof. All individual values and subranges from 50 to less than 100 wt % of a structural base polymer are included and disclosed herein; for example, the amount of base polymer in the polymer composition can range from a lower limit of 50, 60, 70, 80, 90 or 99.5 wt % to an upper limit of 55, 65, 75, 85, 95, or 99.9 wt %. For example, the amount of base polymer in the polymer composition can range from 50 to less than 100 wt %, or in the alternative, from 50 to 80 wt %, or in the alternative, from 80 to less than 100 wt %, or in the alternative, from 70 to 90 wt %.

The structural base polymers are selected from the group consisting of polyesters, styrenic polymers, polymethacrylates, polyvinylchloride, polycarbonate, polyamides, copolymers and blends thereof and combinations thereof.

In a particular embodiment, the structural base polymer is polyvinylchloride.

In yet another embodiment, the structural base polymer is polyvinylchloride and the impact modifier is present in an amount from greater than 0 to 8 wt %. All individual values and subranges from greater than 0 to 8 wt % are included an disclosed herein; for example, the amount of impact modifier in polyvinylchloride may rage from a lower limit of greater than 0, 2, 4 or 6 wt % to an upper limit of 1, 3, 5, 7 or 8 wt %.

Emulsion polymerization reaction vessels, or reactors, are well known and any such reactor may be used. Such reactors, include but are not limited to those discussed in, for example, D. C. Blackley, Emulsion Polymerization (Wiley, 1975).

Suitable emulsifiers include anionic surfactants, cationic surfactants, nonionic surfactants, zwitterionic surfactants, and mixtures thereof. In some embodiments, one or more anionic surfactant is used, optionally in a mixture with one or more nonionic surfactant. Some suitable anionic surfactants include, for example, alkyl sulfates, alkyl sulfonates, alkylaryl sulfates, alkylaryl sulfonates, and mixtures thereof. Some suitable nonionic surfactants include, for example, alkyl polyoxyalkylene nonionic surfactants, aryl polyoxyalkylene nonionic surfactants, polyoxyalkylene block copolymers, and mixtures thereof.

In the practice of the present invention, a reactive mixture is provided in a reaction vessel. The reactive mixture contains water, one or more emulsifier, one or more monomer, and one or more initiator. The ingredients of the reactive mixture may be brought together in any manner. For example, two or more of the ingredients of the reactive mixture, or portions thereof, may be mixed together before the mixture of those ingredients or portions thereof is placed into the reaction vessel. For example, any ingredients or portions thereof that are not mixed together outside of the reaction vessel may be added simultaneously or sequentially to the reaction vessel. Any combination of the above methods of providing the ingredients of the reactive mixture may be used.

After a reactive mixture is present in the reaction vessel, conditions are provided in which the reactive mixture undergoes emulsion polymerization. For example, conditions will be provided as needed for the initiator to form one or more free radical. That is, depending on the initiator used, for example, the reaction mixture may be heated, or a reductant may be added, or the reactive mixture may be exposed to radiation, or a combination thereof. Also, it is contemplated that other conditions that allow emulsion polymerization to succeed (such as, for example, emulsification of monomer, concentration of monomer, concentration of initiator, etc.) will also be provided.

In some embodiments, the conditions in which the reactive mixture undergoes emulsion polymerization will be established simultaneously with the introduction of the reactive mixture into the reaction vessel. For example, if the ingredients of the reactive mixture are not added simultaneously, in some embodiments the conditions in which the reactive mixture undergoes emulsion polymerization may be established simultaneously with the introduction of the final ingredient of the reactive mixture into the reaction vessel.

In some embodiments, the conditions in which the reactive mixture undergoes emulsion polymerization will be established after the introduction of the reactive mixture into the reaction vessel. For example, all of the ingredients of the reactive mixture may be provided in the reaction vessel, and then the contents of the reaction vessel may be heated to a temperature at which the initiator forms one or more free radical.

In conventional shot emulsion polymerization processes, the emulsion polymerization process includes at least one stage that includes at least one shot. In some shot embodiments, at least one shot introduces 10% or more of the total monomer of the entire emulsion polymerization process, by weight based on the weight of the total monomer for the entire emulsion polymerization process. In some shot embodiments, most (greater than 50%) or all of the monomer for the emulsion polymerization process is added to the reaction vessel as part of one or more shots, and each shot introduces 10% or more of the total monomer of the entire emulsion polymerization process, by weight based on the weight of the total monomer for the entire emulsion polymerization process.

EXAMPLES

The following examples illustrate the present invention but are not intended to limit the scope of the invention.

Inventive Impact Modifier Compositions 1-4 were made using a conventional three shot process, with the amount of allyl acrylate crosslinker varied amongst the Impact Modifier Compositions, as shown in Table 1. Butyl acrylate was used as the one or more acrylate monomers used in the core of each of the Impact Modifier Compositions. The shell was made from methyl methacrylate.

Comparative Impact Modifier Composition 1 was made using a conventional three shot process and comprised a core of 99.29 wt % units derived from butyl acrylate and 0.71 wt % units derived from allyl methacrylate.

TABLE 1

| Impact Modifier Examples | wt % ALA in Impact Modifier Core | Swell Ratio |
| --- | --- | --- |
| Comp. Ex. 1 | 0 (0.71 wt % ALMA) | 7.2 |
| Inv. Ex. 1 | 0.2 | 14.2 |
| Inv. Ex. 2 | 0.4 | 9.6 |
| Inv. Ex. 3 | 0.6 | 8.0 |
| Inv. Ex. 4 | 0.9 | 6.6 |
| Inv. Ex. 5 | 1.2 | 5.8 |

Each of the Inventive and Comparative Impact Modifier Compositions were added to PVC at levels of 4 phr and 4.5 phr to produce the Polymer Composition Examples to produce Inventive Polymer Composition Examples 1-4 and Comparative Polymer Composition Example 1, respectively. Table 2 provides the Izod Notched Impact results for each of these polymer compositions.

TABLE 2

| Polymer Composition Examples | Notched Izod Impact % Impact Modifier in Polymer Composition | |
| --- | --- | --- |
| | 4 phr | 4.5 phr |
| Comp. Ex. 1 | 0 | 100 |
| Inv. Ex. 1 | 20 | 100 |
| Inv. Ex. 2 | 50 | 100 |
| Inv. Ex. 3 | 10 | 100 |
| Inv. Ex. 4 | 20 | 90 |
| Inv. Ex. 5 | 10 | — |

Test Methods

Test methods include the following:

Swell ratio is measured by dissolving 5 wt % polymer in THF. The solution is then centrifuged to separate the insoluble portion. After that, the insoluble portion is weighed, dried, and then weighed again, and the swell ratio is defined as the ratio of the wet weight to the dry weight.

Samples are prepared by first preparing a master batch of PVC. In this particular case, the following formulation was used:

| Component | Specifics | parts per hundred (phr) of PVC |
|---|---|---|
| PVC | FORMOLON 622S | 100.00 |
| Heat Stabilizer | ADVASTAB TM-181FS | 1.2 |
| Lubrication package | ADVALUBE B-3314 | 2.7 |
| Lubricating process aid | PARALOID K-175 | 0.5 |
| Process Aid | PARALOID K-400 | 1.0 |
| Filler | TiO$_2$ | 9.0 |
| Filler | UFT(CaCO$_3$) | 3.0 |
| Impact Modifier | See Table 1 | See Table 1 |

PARALOID K-175 is an acrylic polymer processing aids which is commercially available from The Dow Chemical Company (Midland, Mich., USA). PARALOID K-400 is an acrylic copolymer processing aids which is commercially available from The Dow Chemical Company. ADVASTAB TM-181FS is a methyltin based heat stabilizer which is commercially available from PMC Group (Mount Laurel, N.J., USA). ADVALUBE B-3314 is an ester based lubricant which is commercially available from PMC Group. FORMOLON 622S is a polyvinylchloride resin which is commercially available from Formosa Plastics Corporation, U.S.A. (Livingston, N.J. USA). UFT (CaCO$_3$) is commercially available from Omya, Inc. (Cincinnati Ohio, USA).

Components were added using the standard protocol for PVC powder blending in a Henschel-type blender. The resulting powder blends were allowed to stand for at least 24 hours at room temperature. A portion of the powder (usually about 220 grams) was then melt processed in an electric two-roll mill (COLLIN Mill Type # WW 150 p). The mill temperature was set at 190° C. with the front roll mill speed at 26 RPM and the back at 21 RPM. The polymer blend was melt processed for a total time of 5 minutes after fusion occurred. The sample was then placed in a 0.125 inch×8.5 inch×10 inch mold, by suitably folding the mass, and pressed in a RELIABLE press at 190° C. for 3 minutes at 15 tons and then 2 minutes at 45 tons. Cooling was accomplished under 45 tons for an additional 3-4 minutes. Samples were cut into test strips with dimensions according to the ASTM D-256 standard, notched with a mechanical notching tool and allowed to equilibrate at room temperature for 24 hours Testing was carried out with a 50-lb hammer in an Izod pendulum tester. Twenty specimens per sample were tested. The results were divided into brittle breaks and ductile (hinged) breaks, depending on whether, respectively, the sample hit by the hammer was cleanly broken into two portions as the crack traveled through the notch or if the sample remained as a single entity, where the two portions divided by the crack remained connected by a "hinge" of the plastic material. The percentage of ductile—type breaks for each set of specimens was recorded. If any anomalies, such as an observable delamination, were detected after the specimen was broken, that particular specimen was disregarded from the final calculations and the percentage of ductile breaks corrected accordingly.

We claim:

1. A polymer composition comprising:
   from greater than 10 to 30 wt % of one or more core/shell polymers which comprise a crosslinked core having from 98 to 99.9 wt % units derived from butyl acrylate and from 0.1 to 2 wt % units derived from allyl acrylate crosslinker, wherein the crosslinked core has a swell ratio in THF between 7 and 15 and a glass transition temperature, Tg, of less than or equal to 10° C.; and
   a shell having 100 wt % units derived from methyl methacrylate; and
   from 70 to 90 wt % of one or more structural base polymers selected from the group consisting of styrenic polymers, polymethacrylates, polyvinylchloride, polycarbonate, polyamides, copolymers of the foregoing and blends of the foregoing.

* * * * *